W. W. CROOM.
Improvement in Cotton-Seed Planters.
No. 132,388.  Patented Oct. 22, 1872.
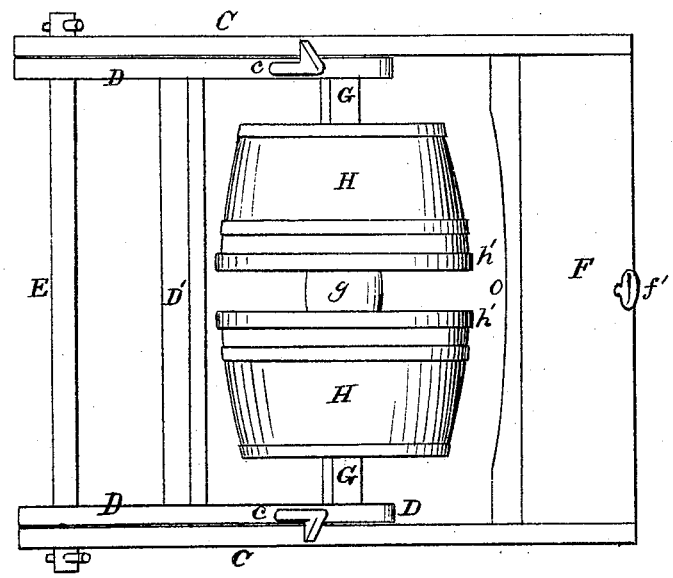
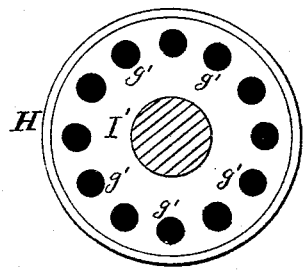
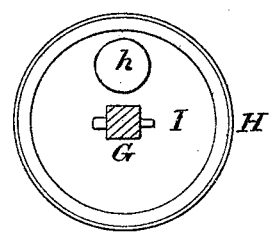

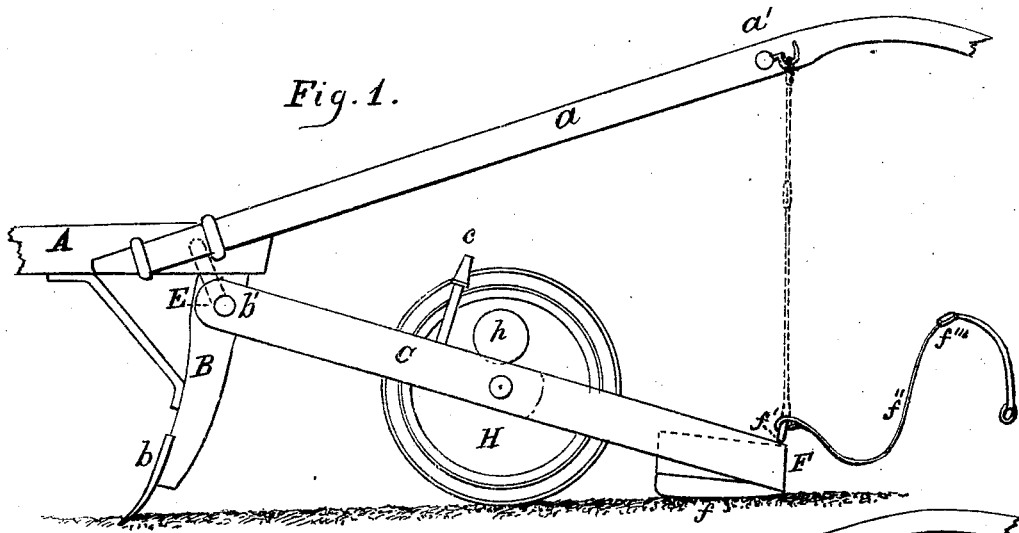
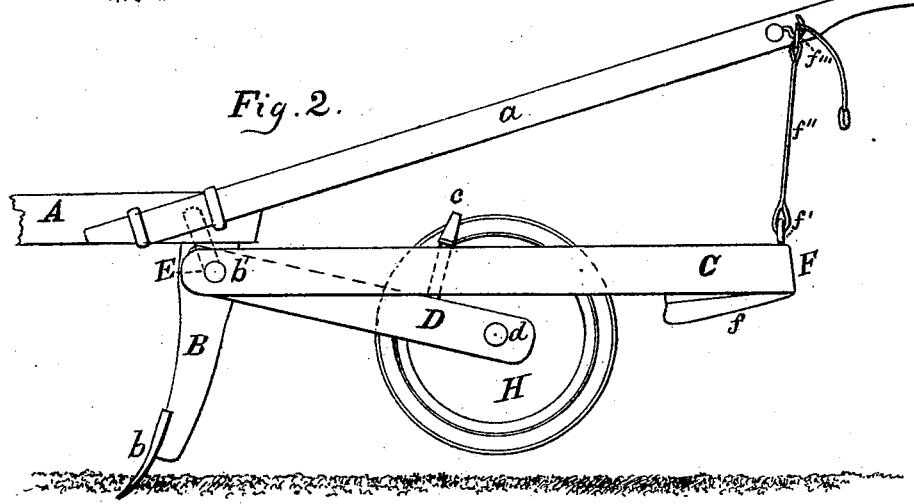

UNITED STATES PATENT OFFICE.

WILLIAM W. CROOM, OF OPELIKA, ALABAMA.

IMPROVEMENT IN COTTON-SEED PLANTERS.

Specification forming part of Letters Patent No. 132,388, dated October 22, 1872.

*To all whom it may concern:*

Be it known that I, WILLIAM W. CROOM, of Opelika, in the county of Lee, in the State of Alabama, have made certain Improvements in Cotton-Seed Planters and Fertilizer-Distributers, of which the following is a specification:

The object of this invention is to introduce into use a cheap, durable, and simple, as well as an effective, machine for the purpose; and it consists in the construction, arrangement, and combination of the parts, as will be more fully hereinafter described.

In the drawing, Figure 1 is a side view of the machine when in operation; Fig. 2 is a side view with the seed-reservoir raised; Fig. 3, a plan or top view of the planter; and Figs. 4 and 5, details.

A represents the beam of a plow, and $a$ the handles; $a'$, the round or stretcher between the handles. B is the plow-standard having the plow or furrow opener $b$ thereon. C is a frame with parallel sides, and has the horizontal shaft E go through the forward ends of the said side pieces at $b'$. D is an interior frame hinged to shaft E at the forward ends of the sides thereof, by which arrangement frame D swings or vibrates vertically independent of frame C. E is a horizontal shaft going through the side pieces of frames C and D and through the rear end of the plow-beam A, or plow-standard B, as may be desired or most convenient, and where it is made fast so as not to slide horizontally or revolve therein. F is the cover and smoother, and forms the rear side of the frame C. The central part, and at the forward side at $o$, is cut out to form a concave in the under side of said cover, while the rear side is straight, and the inclined downwardly-projecting pieces $ff$ will assist in covering the seed and leave the ground smooth where it has passed over. G is a right-angled horizontal revolving axle extending through the frame D near its rear end, and freely revolving therein, by having its extreme ends made round to easily revolve in proper bearings in said frame D, as seen at $d$ in Fig. 2. H H are two conical-shaped seed or fertilizer reservoirs, made fast upon the revolving shaft G, and bear upon the ground upon their ends that have the greatest diameter, around which a metal tire, $h'$, is placed for greater protection against wear or destruction of the seed-receivers. I, Fig. 5, shows the outer end of the conical seed-receivers, in which is a hole, $h$. Through such hole the reservoir is filled with seed or fertilizer, as is desired, and when filled is closed by a small hinged door, cork, or plug. I', Fig. 4, shows the inner and reverse ends of the seed-reservoirs of sheet-metal plates, and having a series of round holes, $g'$ $g'$, one inch in diameter and two inches apart, or of such diameter and distance apart as will give out the right quantity of seed or fertilizer, as the case may be. $f'$ is an eye-bolt in the top of the transverse piece or coverer E. $f'''$ is a strap, cord, or chain, fast at its lower end to eye-bolt $f'$, with rings or loops $f''''$ therein, and so that the frames C and D can by it be raised up to bring the seed-cones out of contact with the ground and be held by hooking the ring or loop $f''''$ upon a hook in the transverse round or stretcher $a'$, as seen in Figs. 1 and 2. $g$ is a gage-washer upon shaft G and between the seed-cones, and separates their seed-delivering ends from each other and at such distance as will best deposit the seed in the furrow made by the plow $b$—say three or four inches. $c$ $c$ are hooks on the upper sides of the frame D with the hooks projecting outward, so that by raising the rear end of frame C by the strap $f''$ the side pieces of said frame C will strike against the hooks and raise frame D and seed-cones H to be out of contact with the ground, as seen in Fig. 2.

The seed-planter and fertilizer-distributer can be attached to any plow by passing shaft or rod E through the rear end of the plow-beam, or through the standard of the plow, and when not wanted to plant seed or distribute fertilizers, can be as easily removed therefrom, and the plow can then be used only as a plow. When attached to the plow and used as a planter or fertilizer-distributer, the plow with the planter is drawn forward, the plow $b$ making a furrow deep enough for planting the seed, the seed-reservoirs having seed therein, or seed in one and fertilizers in the other, and bearing upon the ground freely revolve. The space between the reservoirs will be directly over the furrow made by plow $b$, and as they revolve the seed is by its own specific gravity forced out of the holes $g'$ of head I', falling directly into the furrow, when the coverer, with its concave surface and inclined downwardly-projecting pieces $f$, will force the earth over the seed, filling the furrow and smoothing it even with the surrounding surface.

Having thus described my improvement, what I claim, and wish to secure by Letters Patent, is—

1. The combination of the vibrating frames C and D, with the revolving seed-reservoirs H, constructed in the manner and for the purpose substantially as described.

2. The combination of the vibrating frame D having the revolving seed-reservoirs H, the frame C having the coverer E with beam A or standard B of a plow, when constructed in the manner and for the purpose substantially as described.

WILLIAM W. CROOM.

Witnesses:
   J. A. LOUNDES,
   NEWTON CRAWFORD.